United States Patent [19]
Welsh

[11] Patent Number: 5,898,807
[45] Date of Patent: Apr. 27, 1999

[54] OPTIC FIBER CONNECTOR

[75] Inventor: David Edward Welsh, Tillsonburg, Canada

[73] Assignee: ITT Manufacturing Enterprises, Inc., Wilmington, Del.

[21] Appl. No.: 08/881,816

[22] Filed: Jun. 24, 1997

[51] Int. Cl.⁶ .................................................. G02B 6/36
[52] U.S. Cl. ............................... 385/56; 385/59; 385/35; 385/147; 385/89; 385/93
[58] Field of Search ................................ 385/59, 56, 60, 385/66, 89, 35, 147, 88, 93

[56] References Cited

U.S. PATENT DOCUMENTS

| | | | |
|---|---|---|---|
| 4,082,421 | 4/1978 | Auracher et al. | 350/96.22 |
| 4,597,631 | 7/1986 | Flores | 350/96.2 |
| 4,895,425 | 1/1990 | Iwano et al. | 350/96.2 |
| 4,906,197 | 3/1990 | Noll | 439/79 |
| 5,216,732 | 6/1993 | Knott | 385/59 |
| 5,241,612 | 8/1993 | Iwama | 385/74 |
| 5,265,182 | 11/1993 | Hartley | 385/77 |
| 5,386,486 | 1/1995 | Fan et al. | 385/59 |
| 5,430,819 | 7/1995 | Sizer, II et al. | 385/59 |
| 5,452,390 | 9/1995 | Bechtel et al. | 385/92 |
| 5,521,996 | 5/1996 | Ames et al. | 385/75 |
| 5,533,157 | 7/1996 | Coutts | 385/53 |
| 5,555,332 | 9/1996 | Dean et al. | 385/53 |
| 5,590,229 | 12/1996 | Goldman et al. | 385/59 |
| 5,608,828 | 3/1997 | Couts et al. | 385/59 |
| 5,778,121 | 7/1998 | Hyzin | 385/55 |

*Primary Examiner*—Hung N. Ngo
*Attorney, Agent, or Firm*—Thomas L. Peterson

[57] ABSTRACT

A connector system that includes a pair of connectors (12, 14, FIG. 4) with optical fiber termini (32, 42), is of relatively low cost while assuring sufficiently precise alignment of corresponding termini to transmit a high proportion of light signals between them. A first of the connectors (12) includes an insert (30) with passages that hold termini comprising ball lenses (74) lying in front of optical fiber tips lying in ferrules (82). The plurality of termini are fixed in position and orientation in the insert, but the insert is moveable forwardly and rearwardly (F1, R1) and is biased forwardly by a spring device (160, 162). As a result, the mating faces (70, 72) of the inserts of the two connectors are resiliently pressed against one another in a connector wherein each termini is fixed in position in its insert. Each insert includes a main insert part (120) with a large passage front end (140) that holds the ball lens (74) and a narrower part (142) extending rearwardly therefrom which closely surrounds the ferrule. The insert also includes a spacer (122) lying against the front of the main insert part and holding a ring (150) that presses against the front of the ball lens.

12 Claims, 2 Drawing Sheets

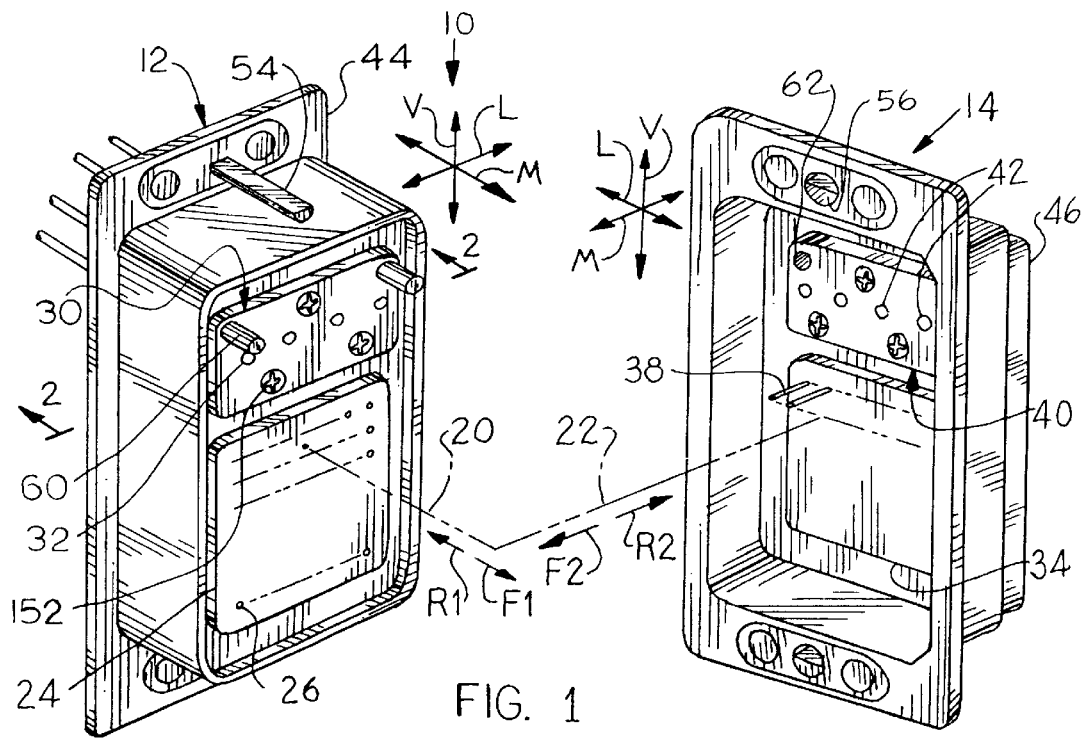
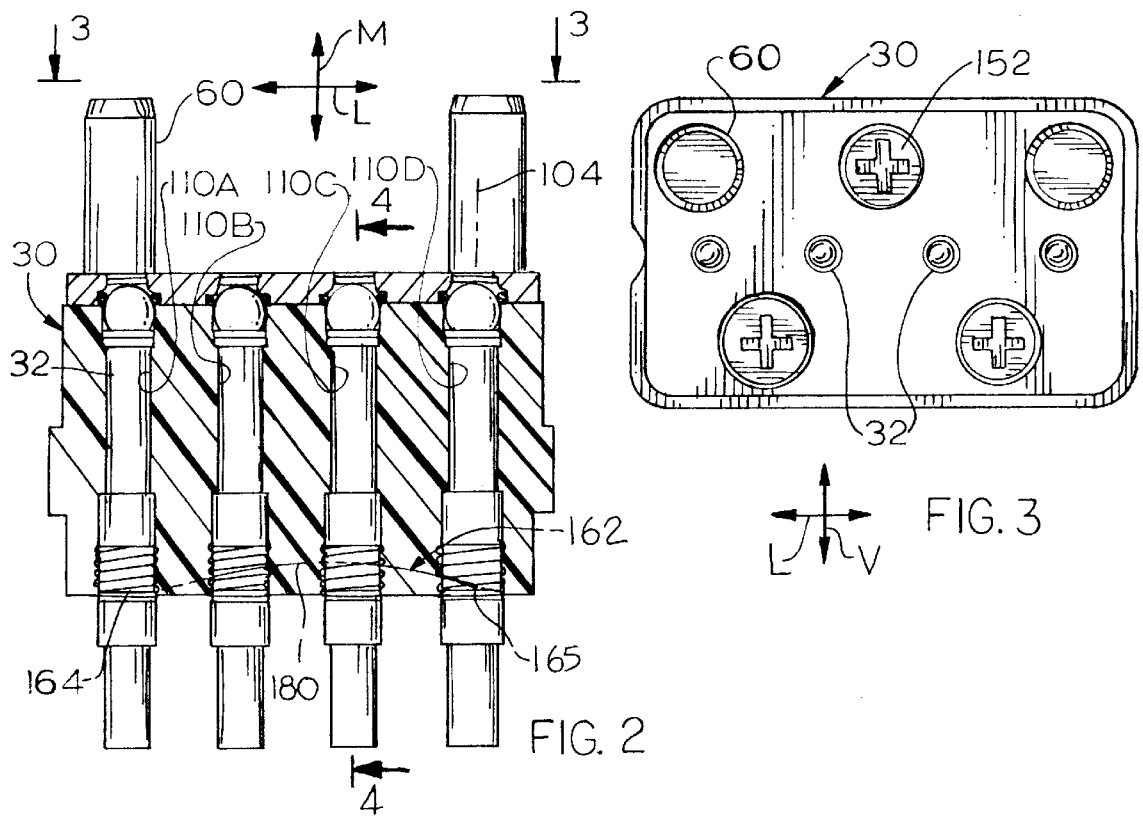

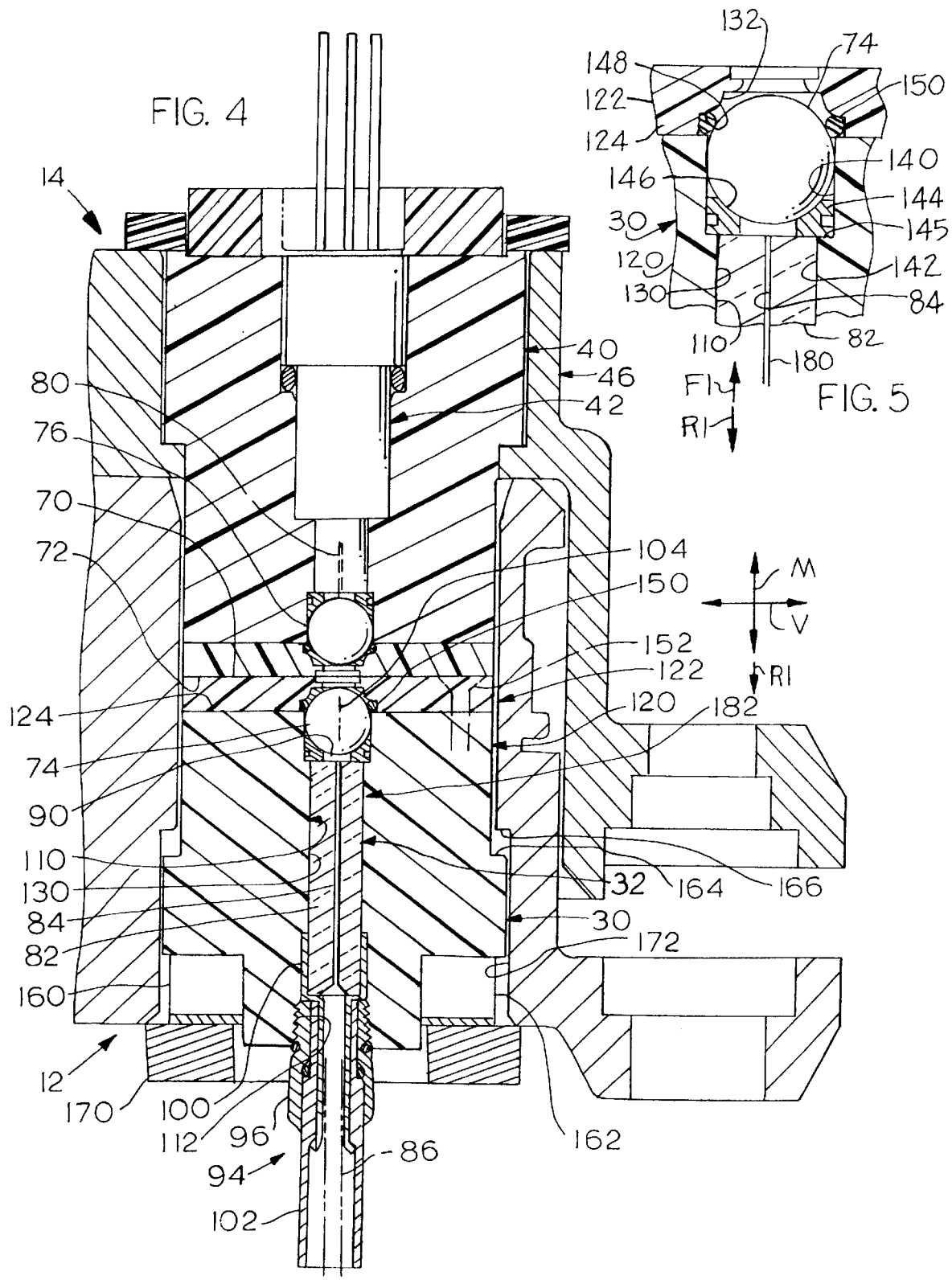

OPTIC FIBER CONNECTOR

BACKGROUND OF THE INVENTION

It is known that two connectors with optical termini must be mated so each of the mating pairs of termini are precisely aligned and maintained at a precise spacing (which may be zero) despite vibrations and shocks. In U.S. patent application Ser. No. 08/744,127 filed Nov. 5, 1996, a precision sleeve aligns the pair of ferrules of two mating termini, while a coil spring biases one of the ferrules forwardly to maintain engagement of the tips. The need for multiple precision alignment sleeves, slidable ferrules and coiled springs to bias them, adds complexity to the connector that has such parts. Also, the removal and replacement of a ferrule and associated parts of a terminus, is more complicated than desirable. An optic fiber connector system which was of simpler construction, but which maintained sufficiently precise engagement of mating termini despite vibrations and shocks, would be of value.

SUMMARY OF THE INVENTION

In accordance with one embodiment of the present invention, an optical fiber connector system with first and second connectors is provided, wherein both connectors can be constructed at moderate cost, both connectors enable easy replacement of a terminus, and the engagement of the termini is maintained despite vibrations and shocks. A first connector includes a frame and an insert lying in the frame with the insert having a plurality of passages that each holds an optical fiber terminus. The insert is slidable in forward and rearward directions within the frame and a spring device urges the entire insert forwardly but allows it to be rearwardly deflected when mated to a second connector. The termini are rigidly fixed in position and orientation within the passages of the insert, so they all move with the insert. Thus, a single spring device, such as a pair of leaf springs, can continue to bias the insert and all termini forwardly when the first and second connectors are mated.

Each of the termini includes a ball lens at the front and a ferrule with an optical fiber-holding bore extending rearwardly from the lens. The insert is formed of a main insert part that has a wide passage part at its front for receiving the ball lens and a narrower passage part extending rearwardly therefrom to closely receive the ferrule. The insert also includes a spacer that lies against the front of the main insert part, with the spacer holding a ring that presses against the front of the ball lens to locate it.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view of a connector system of the present invention, showing plug and receptacle connectors thereof.

FIG. 2 is a simplified sectional view of the insert of one of the connectors of FIG. 1, taken on line 2—2, thereof.

FIG. 3 is a view, taken on line 3—3 of FIG. 2.

FIG. 4 is a detailed sectional view, taken on line 4—4 of FIG. 2, and showing the two connectors of FIG. 1 fully mated.

FIG. 5 is a view of a portion of the first connector of FIG. 4.

DESCRIPTION OF THE PREFERRED EMBODIMENTS

FIG. 1 illustrates a connector system 10 which includes a first or plug connector 12 and a second or receptacle connector 14 that can mate by moving the connectors together along their axes 20, 22. Each of the axes extend in corresponding forward and rearward directions F1, R1 for the first connector 12, and F2, R2 for the second connector 14. Longitudinal directions M are parallel to the forward and rearward directions. Lateral directions are indicated by arrow L, while vertical directions are indicated by arrow V.

The first connector 12 has an electrical contact insert 24 with a plurality of electrical socket contacts 26, and has an optical fiber insert 30 with a plurality of optical fiber termini 32. The second connector has an electrical contact insert 34 with pin contacts 38 that mate with the socket contacts 26, and has an optical fiber insert 40 with termini 42 that are designed to mate with the termini of the first insert. Each insert lies in a corresponding frame 44, 46 of the two connectors. When the connectors are moved together to mate, by moving them together in forward directions F1, F2, polarizing pins 54 of the first connector are received in polarizing holes 56 of the second one. Also, precision alignment pins 60 projecting from the insert 30, are received in precision alignment holes 62 of the mating insert 40.

FIG. 4 shows the two connectors 12, 14 when they have been fully mated. The first and second inserts 30, 40 of the two connectors 12, 14 have flat front insert faces 70, 72 that lie facewise against one another. Each of the termini 32, 42 of the two connectors are of the type that includes a ball lens 74, 76, with light from one ball lens being such as 74 being concentrated into the other ball lens such as 76, and directed therefrom onto the tip of an optical fiber 80 of the terminus of the second connector. The first connector includes a precision ferrule 82 that has a bore 84 that is intended to surround an optical fiber of an optical cable 86 that is connected to the first terminus. It is noted that the optical fiber is usually passed through the bore 84 and held in place with adhesive, with the tip of the fiber lying precisely flush with the forward tip 90 of the ferrule, although there is sometimes a precise offset. The ferrule is held by a holder 94 that includes a nut 96, a forward sleeve 100, and a rearward sleeve 102. The nut 96 is rotatable about the sleeves 100, 102, with O-rings provided to keep out dirt.

The illustrated insert 30 has a row of four through passages 110 (FIG. 2 shows four passages 110A, 110B, 110C, and 110D), with each passage having an axis 104, and with a terminus 32 lying in each passage. Some other connectors include more than four termini. The nut 96 (FIG. 4) of each terminus has a threadable forward end that is threadably engaged with a threaded rear portion 112 of the passage. This (plus close fitting of the ferrule in the insert passage) fixes the ferrule 82 and holder 94 within the corresponding passage.

As also shown in FIG. 5, the insert 30 includes a main insert part 120 and a spacer 122. The main part has a front face 124 that abuts a corresponding rear face of the spacer. The main part has a main passage portion 130 while the spacer has a spacer passage portion 132. The main passage portion 130 includes a wide front part 140 that receives the ball lens 74, and a narrower second part 142 that extends rearwardly from the wide front part and that closely receives the ferrule 82. A seating part 144 lies at the rear of the passage front part 140 against a forwardly-facing shoulder 145, and has a tapered forward surface 146 in which the ball lens 74 nests. The seat part 140 can be formed as part of the passage 110. The spacer passage portion 132 has a wide rear end that forms a ring-receiving part 148 that holds a ring 150. The ring 150 is preferably of elastomeric material, such as an O-ring, that presses the ball lens 74 rearwardly R1 against the tapered surface of the seating part 144. The spacer 122 is pressed tightly against the main insert part 120 by three screws 152 (FIG. 4).

The insert 40 of the second connector 14 is rigidly fixed in position within the second connector frame 46. However, the entire insert 30 of the first connector 12 is slideably mounted within its frame 44. Initially (prior to mating of the connectors) a spring device formed by a pair of leaf springs 160, 162 urges the insert 30 in the first forward direction F1 until shoulders 164, 166 on the insert and frame abut one another. However, the connectors are constructed so as full mating occurs, as shown in FIG. 4, the insert 30 is moved in the first rearward direction R1 by engagement of the faces 70, 72 of the inserts of the two connectors. As a result, when the connectors are fully mated, the inserts are resiliently biased toward each other, which assures that the faces 70, 72 remain in facewise engagement despite vibrations or shocks that might be encountered during use of the connectors. It is noted that the frame 44 of the connector includes a retainer plate 170 that is mounted on the frame after the insert 30 has been inserted into an insert-receiving opening 172. Applicant prefers to provide some clearance between the insert 30 and the opening 172 to permit slight tilt (such as up to 1°) of the insert 30. As a result, if the two faces 70, 72 of the two connectors are not precisely parallel, the insert 30 can tilt slightly so the planes of the two faces are precisely parallel and the faces 70, 72 can lie facewise against each other.

Previously, one of the two connectors of an optical fiber connector system had its termini individually slidable within a passageway of the connector insert, and usually with an individual spring for each terminus. Applicant's resilient biasing only of the entire insert 30, with all termini rigidly fixed in position in the insert, minimizes the cost of construction, facilitates terminus installation, and results in a more rugged connector. This is partially made possible by the fact that the use of one or two ball lenses 74, 76 between the tips of two fibers that are to be coupled, allows efficient light transmission with only moderately precise location of pairs of termini that are to be coupled.

In a connector of the illustrated construction that applicant has designed, the frame 44 (FIG. 1) had an overall width L of 43 mm and the insert 30 had a maximum dimension in the vertical direction V of 15.5 mm, and other dimensions proportional thereto as shown in FIG. 4.

Each of the leaf springs has a shape such as shown in FIG. 2, where the leaf spring 162 is shown as being of the shape of a sine wave of one wavelength (it could include two wavelengths). That is, the spring 162 has an upper end 180 that bears against the insert and a pair of lower ends 164, 166 that bear against the frame (this spring could be turned upside down). This construction is compact while enabling the insert to tilt slightly.

The connector 12 can be assembled by placing a seating part 144 and a ball lens 74 in front part 140 of each main passage portion, placing an elastomeric O-ring 150 in the rear of each spacer passage portion, and fastening each spacer 122 to each insert main part 120. The entire insert 30 is inserted forwardly F1 into the insert-receiving opening 172. The spring device 160, 162 is installed and the retainer plate 170 is fastened to the rest of the frame with screws. It is assumed that none of the ferrules with holders therein has yet to be inserted. Each of a plurality of cables 86 is prepared with its optical fiber 180 inserted into the ferrule bore 84 and the cable fixed in place in the holder 94. Then, the ferrule is inserted into the passageway 110 and the nut 96 is turned in the threaded passageway end 112 until the ferrule tip 90 abuts the seating part. If the cable 86 is damaged and a terminus portion 182 (all but the ball lens 74) at the front end of another cable must be installed, the procedure can be repeated (after the present terminus portion is removed).

Thus, the invention provides an optical fiber connector system and connectors therefor, which enables moderately precise coupling of a pair of optical fibers where each connector is of moderate cost. A first connector has a plurality of optical fiber termini rigidly fixed in position and orientation therein, but with the entire insert being moveable within its connector frame. A spring device urges the insert forwardly while allowing it to slide rearwardly during mating of the two connectors. The insert is also preferably tiltable on the order of magnitude of 1°, to further facilitate alignment during mating. Each terminus includes a main insert part and a spacer, with the spacer holding a ring and with the main insert part having a passage with a large diameter forward end that holds the ball lens and a narrower passage part that holds the ferrule.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A connector system that includes first and second connectors that have corresponding forward ends and that can mate by moving said forward ends in corresponding first and second forward directions to move together, with each of said connectors having a frame and an optic fiber insert lying in the frame, with each insert having a flat front face and a plurality of passages, and with each connector having a plurality of optical fiber termini that each lies in one of said passages, with said termini of said connectors being aligned when the connectors are fully mated, wherein:

the insert of a first of said connectors is moveable in said first forward direction and an opposite first rearward direction, and said first connector includes a spring device that biases said first insert in said first forward direction, and the frame of said first connector has a shoulder that limits forward movement of said first insert, but with the termini in said first insert being fixed in position against movement within said first insert.

2. The system described in claim 1 wherein:

said inserts of said first and second connectors are initially positioned so as they move together during mating, their faces engage each other facewise prior to full mating of said connectors, and said first moveable insert is deflected in said first rearward direction relative to said first frame by deflection of said spring device prior to full mating of said connectors.

3. The system described in claim 1 wherein:

said first insert includes a main insert part with a main front face and a main passage portion extending to said main front face, and a spacer lying against said main portion front face and having a spacer passage portion; said termini includes a first plurality of termini each lying in one of said passages of said first insert with each first terminus including a ball lens lying near the forward end of the main passage portion and an optical fiber-holding ferrule lying behind the ball lens, with said ball lens having a greater diameter than said ferrule;

each of said spacer passage portions has a wide rear part for receiving at least a portion of a corresponding one of said ball lenses and a narrower front end portion;

each of said main passage portions include a wide passage forward end for receiving a ball lens and a narrower second part extending rearwardly from said passage forward end for closely receiving a ferrule;

each of said ball lenses is insertable in said first rearward direction into said passage forward end and each of said ferrules lies primarily in said main passage second part and is insertable in a forward direction therein.

4. The system described in claim 1 wherein:

the passages in said first moveable insert have rear end portions that are internally threaded;

each of said termini in said first moveable insert includes a ferrule with an axis and with a fiber-receiving bore extending along said axis and a nut that is coupled to said ferrule to push is forwardly and that is rotatably mounted about said axis with respect to said ferrule and that is threadable into the rear end portion of one of said passages.

5. A first optical fiber connector for mating with a second optical fiber connector, comprising:

a first frame;

a first insert mounted in said first frame, with said first insert having at least one passage that extends in forward and rearward longitudinal directions and that has a passage axis;

at least one optical fiber terminus mounted in said passage and including a ball lens at the front of said passage and an optical fiber-holding ferrule lying rearward of said ball lens, with said ferrule having a fiber-receiving bore, and with said ball lens being of greater diameter than said ferrule;

said insert includes a main insert part with a main passage part therein, and a spacer lying against a front end of said main insert part with said spacer having a spacer passage part;

said main passage part has a large diameter front end that surrounds most of said ball lens, and a ferrule-holding passage part that extends rearwardly from said large diameter front end and that closely surrounds said ferrule;

said spacer passage part has a ring-receiving part, and said terminus includes a ring lying at least partially in said ring-receiving part, with said ball lens having a forward part lying against said ring, and including walls forming a ring-shaped seat seats against a rearward part of said ball lens.

6. The first optical fiber connector described in claim 5 wherein:

said insert is moveable in forward and rearward directions and is tiltable on the order of magnitude of 1° about axes extending perpendicular to said forward and rearward directions, with respect to said frame;

a spring device lying between said insert and said frame and biasing said frame forwardly.

7. The first optical fiber connector described in claim 5 wherein:

said insert has opposite sides and said spring device includes two leaf springs that each extends in generally a one-wavelength sine wave that has opposite lower ends bearing against said frame and a middle bearing against said insert.

8. The first optical fiber connector described in claim 5 wherein:

said main passage part has a rear end with an internal thread;

said terminus includes a nut with threads for screwing into said main passage part rear end, said nut being rotatable about said passage axis with respect to said ferrule but being coupled to said ferrule to push it forwardly into said passage;

a spring device that is coupled to said frame and to said first insert and that biases said insert forwardly while allowing it to move rearwardly.

9. The first optical fiber connector described in claim 8 wherein:

said insert includes a plurality of passage regions and a plurality of termini assemblies that are substantially identical to one another and that include said passage and said terminus, with each of said termini assemblies including a nut that is threaded into a corresponding passage region and that has a ferrule fixed in position in a corresponding main passage part;

said insert has opposite sides and said spring device includes a pair of leaf springs that are each engaged with one of said sides.

10. A first optical fiber connector for mating with a second optical fiber connector comprising:

a frame that has an insert-receiving opening and a largely rearwardly-facing frame shoulder;

an insert lying in said frame and having a largely forwardly-facing shoulder lying in line with said frame shoulder, said insert having a plurality of parallel passages extending in forward and rearward directions;

a plurality of optic fiber termini, each lying in a fixed position in a corresponding one of said passages of said insert;

a spring device coupled to said frame and to said insert and biasing said insert forwardly against said frame shoulder, but allowing said insert to be deflected rearwardly.

11. The first connector described in claim 10 and including said second connector, wherein:

said second connector has a second insert part with a plurality of passage parts and a plurality of insert assemblies each lying in one of said passage parts, with said insert part being fixed in said passage part and having a flat face;

said insert has a flat forward face positioned to facewise engage said insert part face when said connectors mate, with said insert face projecting forwardly far enough that it is always moved rearwardly while the biasing of said spring device increases, when said connectors become fully mated.

12. A method for mating first and second optic fiber connectors that have first and second inserts, respectively, wherein each insert has forward face and a plurality of passages and a plurality of termini that each lies in one of the passages, comprising:

moving said connectors together until said insert faces engage each other, and then moving said connectors even closer together while moving said first insert in a rearward direction that is away from said second insert against a biasing force until said connectors are fully mated, while maintaining first fiber optic termini that lie in the passages of said first insert in fixed positions and orientations in said first insert.

* * * * *